United States Patent
Moshchuk et al.

(10) Patent No.: US 8,056,667 B2
(45) Date of Patent: Nov. 15, 2011

(54) AUTONOMOUS PARKING STRATEGY BASED ON AVAILABLE PARKING SPACE

(75) Inventors: Nikolai K. Moshchuk, Grosse Pointe, MI (US); Shih-Ken Chen, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 876 days.

(21) Appl. No.: 12/107,130

(22) Filed: Apr. 22, 2008

(65) Prior Publication Data

US 2009/0260907 A1   Oct. 22, 2009

(51) Int. Cl.
*B62D 1/24* (2006.01)

(52) U.S. Cl. ..................... 180/169; 340/932.2
(58) Field of Classification Search .................. 180/167, 180/168, 169, 204; 340/932.2; 701/41
See application file for complete search history.

(56) References Cited

U.S. PATENT DOCUMENTS

| | | | |
|---|---|---|---|
| 4,735,274 A * | 4/1988 | Good et al. ................... | 180/204 |
| 4,931,930 A * | 6/1990 | Shyu et al. ...................... | 701/36 |
| 5,742,141 A | 4/1998 | Czekaj | |
| 5,748,107 A | 5/1998 | Kersken | |
| 6,212,452 B1 * | 4/2001 | Shimizu et al. ................. | 701/41 |
| 6,483,442 B2 | 11/2002 | Shimizu | |
| 6,906,640 B2 | 6/2005 | Gotzig et al. | |
| 6,948,729 B2 | 9/2005 | Zalila | |
| 2005/0236201 A1 * | 10/2005 | Spannheimer et al. ....... | 180/204 |
| 2007/0268157 A1 * | 11/2007 | Hess et al. .................. | 340/932.2 |
| 2008/0094252 A1 * | 4/2008 | Uhler .......................... | 340/932.2 |
| 2009/0085771 A1 * | 4/2009 | Wu et al. .................... | 340/932.2 |

* cited by examiner

*Primary Examiner* — Frank Vanaman

(57) ABSTRACT

A method controls a parallel parking of a vehicle. A distance between the first object and the second object is remotely sensed. The distance is compared to a first predetermined distance and a second predetermined distance. An autonomous first steering strategy maneuver is performed for parking the vehicle between the first object and second object if the distance is greater than the first predetermined distance. The first steering strategy maneuver consists of a first predetermined number of steering cycles for parking the vehicle. An autonomous second steering strategy maneuver is performed for parking the vehicle between the first and second object if the distance is between the first predetermined distance and the second predetermined distance. The second steering strategy maneuver consists of a second predetermined number of steering cycles for parking the vehicle where the second is greater than the first predetermined number of steering cycles.

16 Claims, 3 Drawing Sheets

AUTONOMOUS PARKING STRATEGY BASED ON AVAILABLE PARKING SPACE

BACKGROUND OF INVENTION

The present invention relates generally to a parking strategy for autonomously parallel parking a vehicle.

Parallel parking a vehicle between two vehicles is often a difficult task for a driver. Semi-autonomous parking systems are vehicle based systems designed to aid the driver in performing difficult parking maneuvers such as parallel parking. Such systems either guide the driver in steering the vehicle through its intended trajectory path or increase/decrease power steering efforts when the driver of the vehicle has deviated from the intended trajectory path. In such systems, the driver is required to control the steering efforts or make some adjustments to the steering wheel.

SUMMARY OF INVENTION

An advantage of an embodiment provides a determination of whether an available parking space between a first and second object is sufficient to parallel park the vehicle using a fully autonomous single cycle steering strategy or a fully autonomous two cycle steering strategy.

An embodiment contemplates a method of controlling a parallel parking of a vehicle between a first object and a second object in response to an available parking distance therebetween. A distance between the first object and the second object is remotely sensed. The distance is compared to a first predetermined distance and a second predetermined distance where the first predetermined distance is greater than the second predetermined distance. If the distance is greater than the first predetermined distance, then performing an autonomous first steering strategy maneuver for parking the vehicle between the first object and second object. The first steering strategy maneuver consists of a first predetermined number of steering cycles for parking the vehicle. If the distance is between the first predetermined distance and the second predetermined distance, then performing an autonomous second steering strategy maneuver for parking the vehicle between the first and second object. The second steering strategy maneuver consists of a second predetermined number of steering cycles for parking the vehicle where the second predetermined number of steering cycles is greater than the first predetermined number of steering cycles.

An embodiment contemplates an autonomous parking system for parallel parking a driven vehicle between a first object and a second object. The system includes a controller for autonomously controlling a steering of the driven vehicle for parallel parking the driven vehicle and a sensing device for detecting objects proximate to the driven vehicle. The sensing device is in communication with the controller to provide signals to the controller for identifying a space between the first object and the second object. A distance is determined between the first object and the second object in response to sensing the detected objects. The controller compares the determined distance to a first predetermined distance and a second predetermined distance. The controller determines that a first steering strategy maneuver may be used to park the vehicle if the determined distance is greater than the first predetermined distance. The first steering strategy maneuver includes a first predetermined number of steering cycles. The controller determines that a second steering strategy maneuver may be used to park the vehicle if the determined distance is between the first predetermined distance and the second predetermined distance. The second steering strategy maneuver includes a second number of steering cycles.

DETAILED DESCRIPTION

Figure 1:
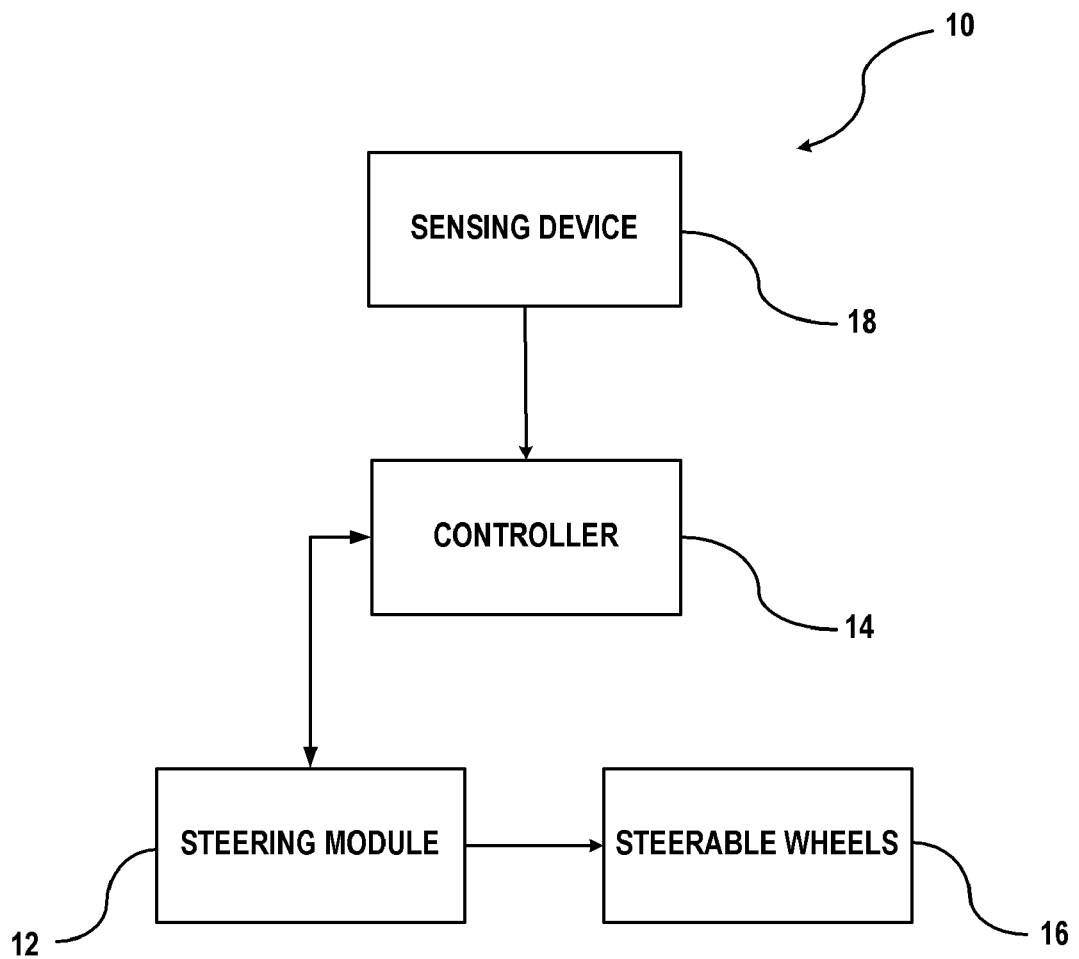
FIG. 1 is a block diagram showing an autonomous parallel parking system according to an embodiment.

There is shown in FIG. 1 an embodiment of an autonomous steering system 10 for parallel parking a vehicle. The autonomous steering system 10 includes a steering module 12 and a controller 14 for controlling steerable wheels 16 of the vehicle. The steering module 12 may be an electronic module or similar device that is capable of pivoting the steerable wheels 16 without a driver's steering demand through a steering wheel of the vehicle. The controller 14 provides control input signals to the steering module 12, such as a conventional electronic power steering module, for controlling the pivoting of the steerable wheels during a parking maneuver. The controller 14 may be separate from the steering module 12 or may be integrated within the steering module 12 as a single unit.

The autonomous steering system 10 further includes a sensing device 18 for detecting objects proximate to the driven vehicle. The sensing device 18 detects the presence and non-presence of objects laterally from the vehicle for determining an available parking space between a first object and a second object. The sensing device 18 may include a radar-based sensing device, an ultrasonic-based sensing device, an imaging-based sensing device, or similar device capable of providing a signal characterizing the available space between the objects. The sensing device 18 is in communication with the controller 14 for providing signals to the controller 14. The sensing device 18 may be capable of determining the distance between the respective objects and communicating the determined distance to the controller 14 or the sensing device 18 may provide signals to the controller 14 to be used by the controller 14 to determine the distance of the spacing between the objects.

In response to the determined spacing between the first and second objects, controller 14 determines whether to apply a first steering strategy maneuver or a second steering strategy maneuver. The first steering strategy maneuver includes a single cycle steering strategy where the steerable wheels are pivoted only in a single direction before returning to a center position for bringing the vehicle to a parked position. The center position being defined when the steerable wheels are in a position where the vehicle if moving would be driving in a straight path.

Figure 2:
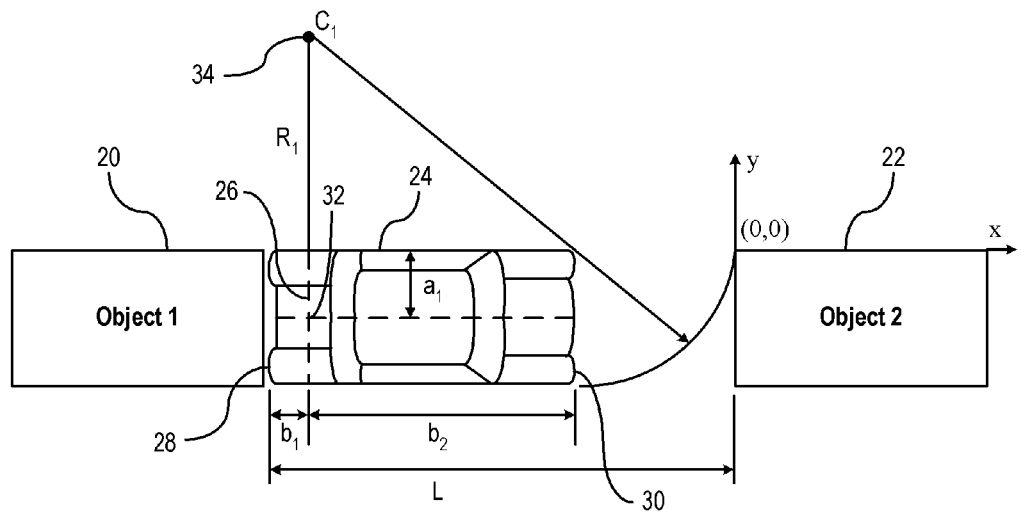
FIG. 2 is a geometric schematic illustrating vehicle parameters for applying a first steering strategy maneuver according to an embodiment

FIG. 2 illustrates a geometric schematic showing vehicle parameters used for determining the minimum spacing required for applying the first steering strategy maneuver for a respective vehicle. The model for determining whether the vehicle can be successfully parked utilizing the single cycle steering strategy is based on the assumption that a vehicle parked at a most rearward position in a parking space of a particular length can leave the parking spot utilizing a single cycle steering strategy with the steerable wheels at full steer.

That is, if the vehicle can leave the parking space utilizing only a single maneuver, then the vehicle can be parked in the parking space utilizing only a single steering maneuver.

The determination for the single cycle steering maneuver will be discussed as follows. A first object 20 and the second object 22 are shown having a spacing L therebetween. The width of the available parking space is assumed to be a width of the vehicle. A vehicle, illustrated generally by 24, includes a respective vehicle width, vehicle length, and vehicle turning radius at full steer based on the design of the vehicle chassis. The minimum distance required to apply the first steering strategy maneuver is predetermined and specific to a vehicle based on the vehicle characteristics as described. The formula for determining a first distance $L_1$ (i.e., minimum spacing for applying the first steering strategy maneuver) is represented by:

$$L_1 = [(b_2)^2 + 4(a_1)(R_1)]^{1/2} + b_1$$

where $a_1$ is half of a width of the vehicle along a rear axle 26; $b_1$ is a longitudinal distance from a rear 28 of the vehicle to the rear axle 26 of the vehicle; $b_2$ is a longitudinal distance from a front 30 of the vehicle to the rear axle 26 of the vehicle; and $R_1$ is a distance from a midpoint 32 of the rear axle 26 to a center of the turning radius 34 of the vehicle at full steer to the left as illustrated in FIG. 2. The turning radius, herein, is based on the steerable wheels being at a full steer position. Full steer correlates to the steerable wheels being pivoted to the maximum pivotable position in a single direction. The determined distance $L_1$ is the minimum distance required between the first object 20 and second object 22 for applying the single steering strategy maneuver. If the actual measured distance between the first object 20 and second object 22 is less then the predetermined distance $L_1$, then the single steering strategy maneuver is not applied.

The second steering strategy maneuver includes a two cycle steering strategy where the steerable wheels are first pivoted in a first direction to a first steering position (i.e., first steering maneuver). Thereafter, the wheels are then pivoted in a direction opposite to the first direction where the steerable wheels pivot past the normal position to a second position (i.e., second steering maneuver). Determining whether the vehicle can be successfully parallel parked utilizing the two cycle steering strategy is modeled on a condition of whether the vehicle parked in the available parking space can leave the parking spot utilizing two steering maneuvers. That is, if the vehicle can leave the parking space utilizing only two steering maneuvers, then the vehicle can be parallel parked in the parking space utilizing only two steering maneuvers. A first steering maneuver includes the driven vehicle moving backward in the available parking space at a respective turning angle where a respective rear corner of the vehicle reaches a respective boundary (i.e., front of the first object). A second steering maneuver includes the vehicle moving forward where a respective front corner of the vehicle reaches a respective rear boundary of the second object (i.e., rear corner of the second object).

Figure 3:
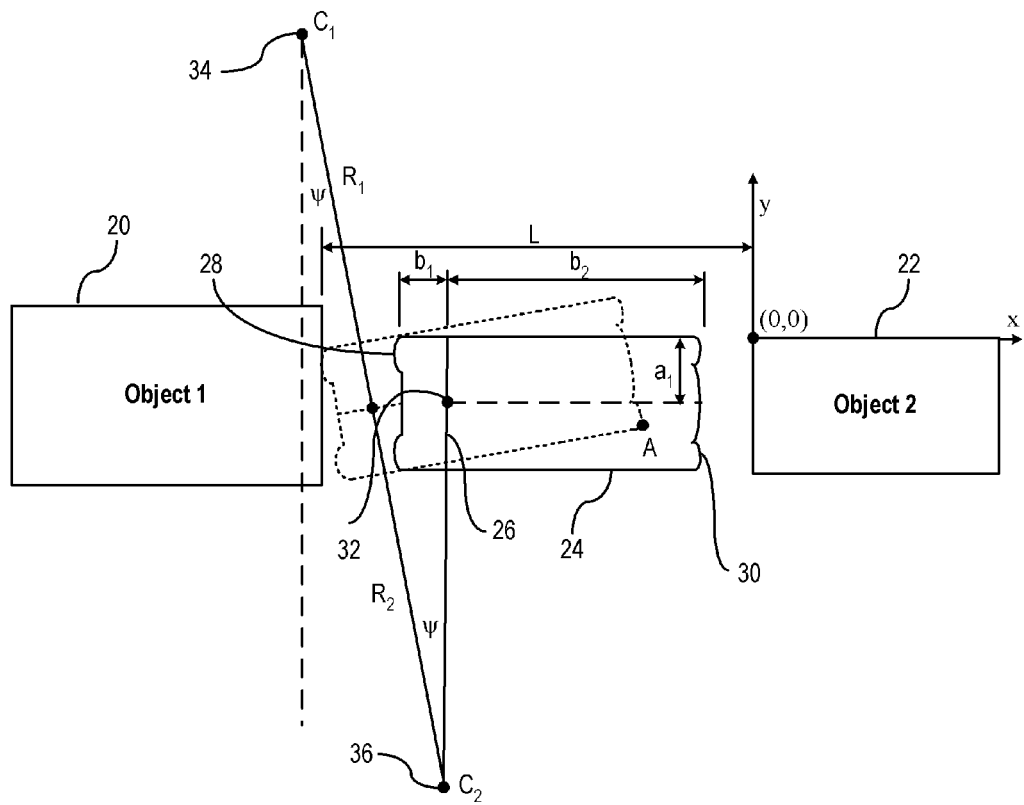
FIG. 3 is a geometric schematic illustrating vehicle parameters for applying a second steering strategy maneuver according to an embodiment

FIG. 3 illustrates a geometric schematic illustrating vehicle parameters used for determining the minimum spacing required for applying the second steering strategy maneuver for a respective vehicle. The first object 20 and the second object 22 having a spacing L therebetween. The width of the available parking space is assumed to be the width of the vehicle. The minimum space required to apply the second steering maneuver strategy is predetermined based on the respective vehicle's characteristics such as those described above. The formula for determining a second distance (i.e., minimum spacing for applying the second steering strategy maneuver) is represented by:

$$L_2 = (R_2 + a_1)\sin\psi + b_1\cos\psi + b_2$$

where $a_1$ is half of the width of the vehicle along the rear axle 26; $b_1$ is the longitudinal distance from the rear 28 of the vehicle to the rear axle 26 of the vehicle; $b_2$ is the longitudinal distance from the front 30 of the vehicle to the rear axle 26 of the vehicle; $R_2$ is the distance from a midpoint of the rear axle 32 to the center of the turning radius 36 for a vehicle steering to the right as illustrated in FIG. 3, and $\psi$ is an angle of the vehicle as a whole that the vehicle must turn before contacting the rearward object 20 in order to complete a two-cycle parking maneuver. That is, the turn angle is the minimum angle that the vehicle should be positioned as a whole after applying the first steering maneuver so that the vehicle may initiate the second steering maneuver in moving forward to exit the parking space without contacting object 22. The turn angle $\psi$ required to complete the two-cycle parking maneuver may be solved for by the following equation:

$$[b_2 + (R_1 + R_2)\sin\psi]^2 + [-(R_2 + a_1) + (R_1 + R_2)\cos\psi]^2 = [-b_2(1-\cos\psi) - (R_2 - a_1)\sin\psi]^2 + b_2 + (R_1 + R_2)\sin\psi]^2 + [b_2\sin\psi - (R_2 - a_1)(1-\cos\psi) - 2a_1 + (R_2 + a_1) - (R_1 + R_2)\cos\psi]^2$$

where $R_2$ is the distance from a midpoint of the rear axle 32 to the center of the turning radius ($C_2$) 36 of the vehicle corresponding to a right vehicle steer. The other variables shown in the equations are the same as described above. In the above equation, the left side of the equation represents the distance from the center of turn radius ($C_1$) 34 (i.e., for the driven vehicle in forward motion) to a rear corner of the second object 22 designated as (0,0) coordinate shown in FIG. 3. The right side of the equation represents the distance between the center of the turn radius ($C_1$) 34 and an outer front corner of the driven vehicle 24 designated as point A. This equation establishes the relationship of the turn radius of the vehicle with respect to the object 22 in order to safely leave the parking spot from a respective position.

Once the turn angle $\psi$ has been solved for in the above equation, the turn angle $\psi$ may be substituted in the previous equation to determine the second distance $L_2$. The second distance $L_2$ is the minimum distance required between the first object 20 and second object 22 for applying the second steering strategy maneuver. If the actual measured distance between the first object 20 and second object 22 is less then the second distance $L_2$, then the second steering strategy maneuver is not applied.

The steering module 12 (shown in FIG. 1) performs a control action for parallel parking the vehicle based on the determination of whether to apply the first steering strategy maneuver or the second steering strategy maneuver given the distance L between the first and second objects. If the determined spacing between the objects is insufficient to perform either the first steering strategy maneuver or the second steering strategy maneuver, then no control action is performed.

Figure 4:
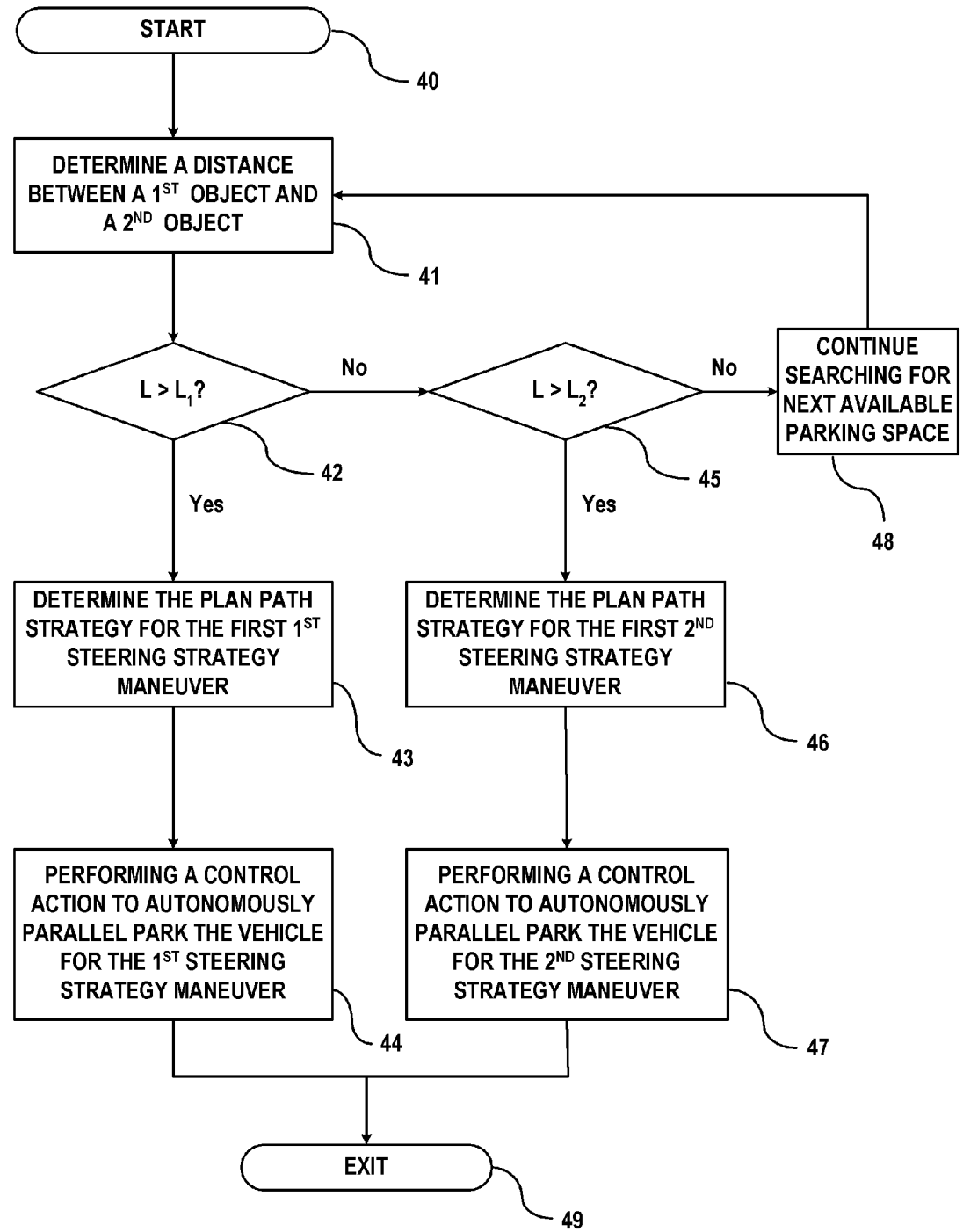
FIG. 4 is a flowchart for a method for parallel parking the vehicle according to an embodiment.

FIG. 4 illustrates a method of an embodiment for parallel parking the vehicle. In step 40, the parallel parking routine is started. In step 41, the distance between a first object and a second object for parallel parking the vehicle is determined. To determine the distance between the first object and the second object, a sensing device is actuated for detecting the proximity of the first object and second object adjacent to the driven vehicle. The presence of the first object is detected as the driven vehicle travels along a side of the first object. Thereafter, a non-presence of the first object is detected as the driven vehicle travels past the first object. The presence of the second object is detected as the driven vehicle travels along side the second object. The distance traveled by the driven vehicle between a point when the first object is no longer detected and a point when the second object is first detected is determined. The distance between the objects may be a calculated or measured determination based on the sensing device utilized.

In step 42, a determination is made as to whether the determined distance is greater than a first predetermined distance. The first predetermined distance is determined from the vehicle parameters as described above. If determination is made that the first determined distance is greater than the first predetermined distance, then in step 43, the system determines a parking path plan for the first steering strategy maneuver. In step 44, a control action is performed for autonomously parallel parking the vehicle using the first steering strategy maneuver. The routine proceeds to step 49 where the routine is exited after a successful parking maneuver.

In step 42, if the determination is made that the determined distance is less than the first predetermined distance, then the routine continues to step 45 to determine whether the determined distance is greater than the second predetermined distance. If the determined distance is greater than the second predetermined distance, then the routine proceeds to step 46 where the system determines a parking path plan for the second steering strategy maneuver. In step 47, a control action is performed for autonomously parallel parking the vehicle using the second steering strategy maneuver. The routine proceeds to step 49 where the routine is exited after a successful parking maneuver.

In step 45, if the determination is made that the predetermined distance is less than the second predetermined distance, then the routine proceeds to step 48 where the search continues for a next available parking space. When a next available parking space is found, the routine returns to step 41 to determine the distance between the objects.

While certain embodiments of the present invention have been described in detail, those familiar with the art to which this invention relates will recognize various alternative designs and embodiments for practicing the invention as defined by the following claims.

What is claimed is:

1. A method of controlling a parallel parking of a vehicle between a first object and a second object in response to an available parking distance therebetween, the method comprising the steps of:
   remotely sensing a distance between the first object and the second object;
   comparing the distance to a first predetermined distance and a second predetermined distance wherein the first predetermined distance is greater than the second predetermined distance;
   if the distance is greater than the first predetermined distance, then performing an autonomous first steering strategy maneuver for parking the vehicle between the first object and second object, the first steering strategy maneuver consisting of a first predetermined number of steering cycles for parking the vehicle; and
   if the distance is between the first predetermined distance and the second predetermined distance, then performing an autonomous second steering strategy maneuver for parking the vehicle between the first and second object, the second steering strategy maneuver consisting of a second predetermined number of steering cycles for parking the vehicle wherein the second predetermined number of cycles is greater than the first predetermined number of steering cycles;
   wherein the first steering strategy maneuver comprises a single steering cycle to park the vehicle, and wherein the first predetermined distance $L_1$ used to determine whether to apply the single cycle steering strategy is derived from the following equation:

$$L_1 = [(b_2)^2 + 4(a_1)(R_1)]^{1/2} + b_1$$

where $b_1$ is a longitudinal distance from a rear of the vehicle to a rear axle of the vehicle, $b_2$ is a longitudinal distance from a front of the vehicle to the rear axle of the vehicle, $a_1$ is half of a width of the vehicle along the rear axle, and $R_1$ is a distance from a midpoint of the rear axle to a center of the turning radius of the vehicle.

2. The method of claim 1 wherein the center turning radius of the vehicle is determined when steerable wheels of the vehicle are positioned at full steer.

3. The method of claim 1 wherein the second steering strategy maneuver comprises two steering maneuvers.

4. The method of claim 3 wherein a first steering maneuver is a backward steering maneuver.

5. The method of claim 4 wherein a second steering maneuver is a forward steering maneuver.

6. The method of claim 1 wherein the step of remotely sensing the distance between the first object and second object comprises: activating a sensing device for detecting the proximity of the first object and second object adjacent to the driven vehicle;
   detecting the presence of the first object as the driven vehicle travels along a side of the first object;
   detecting the non-presence of the first object as the driven vehicle travels past the first object;
   detecting the presence of the second object as the driven vehicle travels along side the second object; and
   determining the distance traveled by the driven vehicle between a point when the first object is no longer detected and a point when the second object is first detected.

7. The method of claim 6 wherein detecting the presence and non-presence of the first and second objects are performed by an ultrasonic device.

8. The method of claim 6 wherein detecting the presence and non-presence of the first and second object are performed by a radar system.

9. The method of claim 6 wherein detecting the presence and non-presence of the first and second object are performed by an imaging device.

10. An autonomous parking system for parallel parking a driven vehicle between a first object and a second object, the system comprising:
    a controller for autonomously controlling steering of the driven vehicle for parallel parking the driven vehicle, and
    a sensing device for detecting objects proximate to the driven vehicle, the sensing device in communication with the controller to provide signals to the controller for identifying a space between the first object and the second object;
    wherein a distance is determined between the first object and the second object in response to sensing the detected objects, wherein the controller compares the determined distance to a first predetermined distance and a second predetermined distance, wherein the controller determines that a first steering strategy maneuver may be used to park the vehicle if the determined distance is greater than the first predetermined distance, the first steering strategy maneuver including a first predetermined number of steering cycles, and wherein the controller determines that a second steering strategy maneuver may be used to park the vehicle if the determined distance is between the first predetermined distance and the second predetermined distance, the second steering strategy maneuver including a second number of steering cycles, wherein the first predetermined distance $L_1$ used to determine whether to apply the first steering strategy is derived from the following equation:

$$L_1=[(b_2)^2+4(a_1)(R_1)]^{1/2}+b_1$$

where $b_1$ is a longitudinal distance from a rear of the vehicle to a rear axle of the vehicle, $b_2$ is a longitudinal distance from a front of the vehicle to the rear axle of the vehicle, $a_1$ is half of a width of the vehicle along the rear axle, and $R_1$ is a distance from a midpoint of the rear axle to a center of the turning radius of the vehicle.

11. The autonomous parking system of claim 10 further comprising an electric power steering system for providing steering torque to the steerable wheels of the vehicle.

12. The autonomous parking system of claim 10 wherein the sensing device includes a radar-based sensing device.

13. The autonomous parking system of claim 10 wherein the sensing device includes an ultrasonic based sensing device.

14. The autonomous parking system of claim 10 wherein the sensing device includes an image based sensing device.

15. A method of controlling a parallel parking of a vehicle between a first object and a second object in response to an available parking distance therebetween, the method comprising the steps of:

remotely sensing a distance between the first object and the second object;

comparing the distance to a first predetermined distance and a second predetermined distance wherein the first predetermined distance is greater than the second predetermined distance;

if the distance is greater than the first predetermined distance, then performing an autonomous first steering strategy maneuver for parking the vehicle between the first object and second object, the first steering strategy maneuver consisting of a first predetermined number of steering cycles for parking the vehicle; and if the distance is between the first predetermined distance and the second predetermined distance, then performing an autonomous second steering strategy maneuver for parking the vehicle between the first and second object, the second steering strategy maneuver consisting of a second predetermined number of steering cycles for parking the vehicle wherein the second predetermined number of cycles is greater than the first predetermined number of steering cycles;

wherein the second steering strategy maneuver comprises two steering maneuvers, and wherein the second predetermined distance $L_2$ used to determine whether to apply the second steering strategy maneuver is derived from the following equation:

$$L_2=(R_2+a_1)\sin \psi+b_1 \cos \psi+b_2$$

where $b_1$ is a longitudinal distance from a rear of the vehicle to a rear axle of the vehicle, $b_2$ is a distance from a front of the vehicle to the rear axle of the vehicle, $a_l$ is half of a width of the vehicle along the rear axle, and $R_2$ is a distance from a midpoint of the rear axle and a center of the turning radius of the vehicle during the first steering maneuver, and $\psi$ is a minimum turn angle after the first steering maneuver.

16. The method of claim 15 wherein the turning radius of the vehicle is determined when steerable wheels of the vehicle are positioned at full steer.

* * * * *